United States Patent [19]

Cornell

[11] 4,158,290
[45] Jun. 19, 1979

[54] ELECTRO-HYDRAULIC CONTROLLER

[75] Inventor: Charles R. Cornell, Battle Creek, Mich.

[73] Assignee: Eaton Corporation, Cleveland, Ohio

[21] Appl. No.: 909,138

[22] Filed: May 24, 1978

Related U.S. Application Data

[63] Continuation-in-part of Ser. No. 795,689, May 11, 1977, Pat. No. 4,091,617.

[51] Int. Cl.² .............................................. F16H 39/46
[52] U.S. Cl. ...................................... 60/445; 60/448; 60/449; 60/DIG. 2
[58] Field of Search ................. 60/445, 448, 449, 451, 60/DIG. 2, 465

[56] References Cited

U.S. PATENT DOCUMENTS

| | | | |
|---|---|---|---|
| 2,588,742 | 3/1952 | McCallum | 60/DIG. 2 |
| 3,365,886 | 1/1968 | Moon | 60/448 X |
| 3,864,915 | 2/1975 | Metailler | 60/DIG. 2 |
| 3,924,410 | 12/1975 | Cornell et al. | 60/445 |

*Primary Examiner*—Edgar W. Geoghegan
*Attorney, Agent, or Firm*—R. J. McCloskey; J. Yakimow; L. Kasper

[57] ABSTRACT

An electro-hydraulic control for a hydrostatic transmission including a variable displacement hydraulic pump, a fixed displacement hydraulic motor, and fluid operable strokers to vary the displacement of the pump. The electro-hydraulic control is in series between the charge pump and the standard manual controller and determines the pressure of the charge fluid ported to the standard controller. The electro-hydraulic control includes a spool biased toward a first position to port fluid from the charge pump to the standard controller, and biased toward a second position to relieve to tank the pressure of fluid ported to the manual controller. The biasing toward the second direction is accomplished, in part, by pressure in a fluid chamber exerting a biasing force on the spool, the fluid chamber being in communication with drain through a variable orifice which is variable in response to a pressure command signal. This signal is generated by control logic including a horsepower command signal generator which is variable to correspond to a maximum desired input horsepower, and circuitry providing a horsepower approximation signal representing the product of motor output speed and the instantaneous pressure command signal. The circuitry compares the horsepower command and horsepower approximation signals and generates a new pressure command signal tending to minimize the difference between the horsepower command and approximation signals. As a result, the commanded maximum system pressure varies, such that the product of maximum system pressure and motor output speed (proportional to pump flow) is constant, for a given input horsepower setting.

14 Claims, 6 Drawing Figures

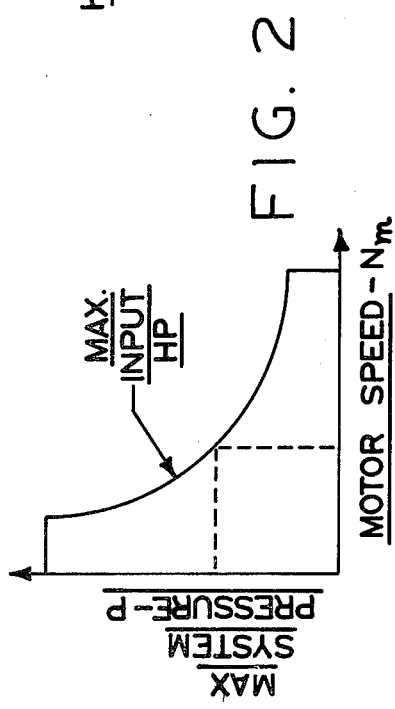
FIG. 3
FIG. 2
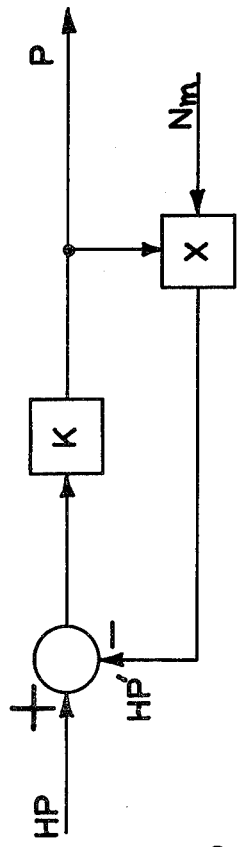
FIG. 4

ELECTRO-HYDRAULIC CONTROLLER

CROSS REFERENCE TO RELATED APPLICATIONS

This application is a continuation-in-part of U.S. application Ser. No. 795,689, now U.S. Pat. No. 4,091,617 filed May 11, 1977, granted May 30, 1978.

BACKGROUND OF THE INVENTION

The present invention relates to an electro-hydraulic control for varying the control pressure to a standard controller used to port fluid to the servos of a variable displacement pump.

It is common in designing controls for hydrostatic transmissions to design a distinct control for each desired function. For example, a pressure override (P.O.R.) control is designed to monitor the system pressure of a transmission to protect the transmission from excessive overloads. P.O.R. controls are well known in the art and will be discussed in the present application.

Another common control is an input torque limiter (I.T.L.) or input horsepower limiter (H.P.L.) which matches the torque of a hydrostatic transmission to that of the prime mover. I.T.L. controls generally make use of cams to reset the compensating override pressure for each swash plate position to maintain constant the product of system pressure and pump displacement. Other known I.T.L. controls are hydraulic wherein a pressure drop across a compensating or override spool is maintained proportional to the pump displacement. This is generally accomplished by means of a variable orifice. Other known I.T.L. controls are electrical. In the electrical I.T.L. controls, the displacement of the pump and the system pressure are each measured and then multiplied electrically to produce a signal which is then used to control the displacement of the pump. All of the electrical I.T.L. controls of which applicant is aware make use of a pressure transducer.

In addition, the known controls, as well as those disclosed in co-pending Ser. No. 795,689, require reading pump displacement as an input to the system logic. This requires that at least a portion of the controls be located on the pump, to sense the swashplate position, thus making the system less "flexible" as to the use of remote controls and the relative locations of various system components. Also, sensing displacement electrically results in a DC signal which can be adversely effected by "noise", i.e., stray electrical signals and interference. Finally, sensing displacement is generally relatively more expensive than sensing certain other system characteristics, such as shaft speeds.

Accordingly it an object of the present invention to provide a simple, inexpensive electro-hydraulic controller which can be used to limit or control input torque or horsepower without sensing swashplate position.

In many of the electrical controls of the type discussed above, it is desirable to generate a command signal which is a quotient resulting from the division of one system characteristic by another, wherein either the dividend or the divisor may be a manually selected input, or may be a variable system characteristic. For example, in the electro-hydraulic H.P.L. control disclosed hereinafter, the system logic generates a variable pressure command signal corresponding to maximum system pressure for any given motor output speed. Mathematically, this pressure command signal is obtained by dividing the desired input horsepower (a manual setting) by the motor output speed (a variable system characteristic).

Known electro-hydraulic controls have accomplished necessary division functions in generally one of two ways: either the quotient is approximated, using a linear approximation (or a series of linear approximations), or the quotient is actually calculated by means of an analog divider. The linear approximation method results in relatively poor performance, while the analog division method is excessively expensive for application in hydrostatic transmission controls.

Accordingly, it is another object of the present invention to provide an electro-hydraulic control including a simple, inexpensive method of calculating a "quotient" which is then used by the control as a command signal.

SUMMARY OF THE INVENTION

The above and other objects of the invention are accomplished by the provision of a control system for a hydrostatic transmission including a pump and a motor, and having fluid operable means for varying the displacement of the pump and a source of pressurized fluid for operating the fluid operable means. The control system comprises a housing defining a valve bore, an inlet fluid port, a control fluid port and a drain fluid port, the ports being in fluid communication with the valve bore. A valve is disposed in the valve bore and is movable between a first position permitting fluid communication between the inlet port and the control port, and a second position permitting fluid communication between the control port and the drain port. The valve is biased toward the first position by a first biasing means and toward the second position by a second biasing means. One of the biasing means includes means for generating a variable electrical pressure command signal P, and means responsive to the command signal P to provide a variable biasing force, the variable biasing force being related to the variable pressure command signal P in a known manner. The means for generating the command signal P includes a setting command signal generator which is variable to correspond to a desired input horsepower setting. The command signal generating means also includes means providing a horsepower setting approximation signal proportional to the product of motor output speed and the instantaneous variable pressure command signal P. The system also includes means for comparing the input horsepower setting and the horsepower setting approximation signal and continually generating a new pressure command signal P tending to minimize the difference between the input setting and the setting approximation signal.

BRIEF DESCRIPTION OF THE DRAWINGS

FIG. 2 is a constant horsepower curve of the type utilized by the control system of the invention.

FIG. 3 is a block diagram of the basic logic used by the control system of the invention.

FIG. 4 is a circuit diagram of a preferred circuit implementing the logic of FIG. 3.

DESCRIPTION OF THE PREFERRED EMBODIMENTS

Figure 1:
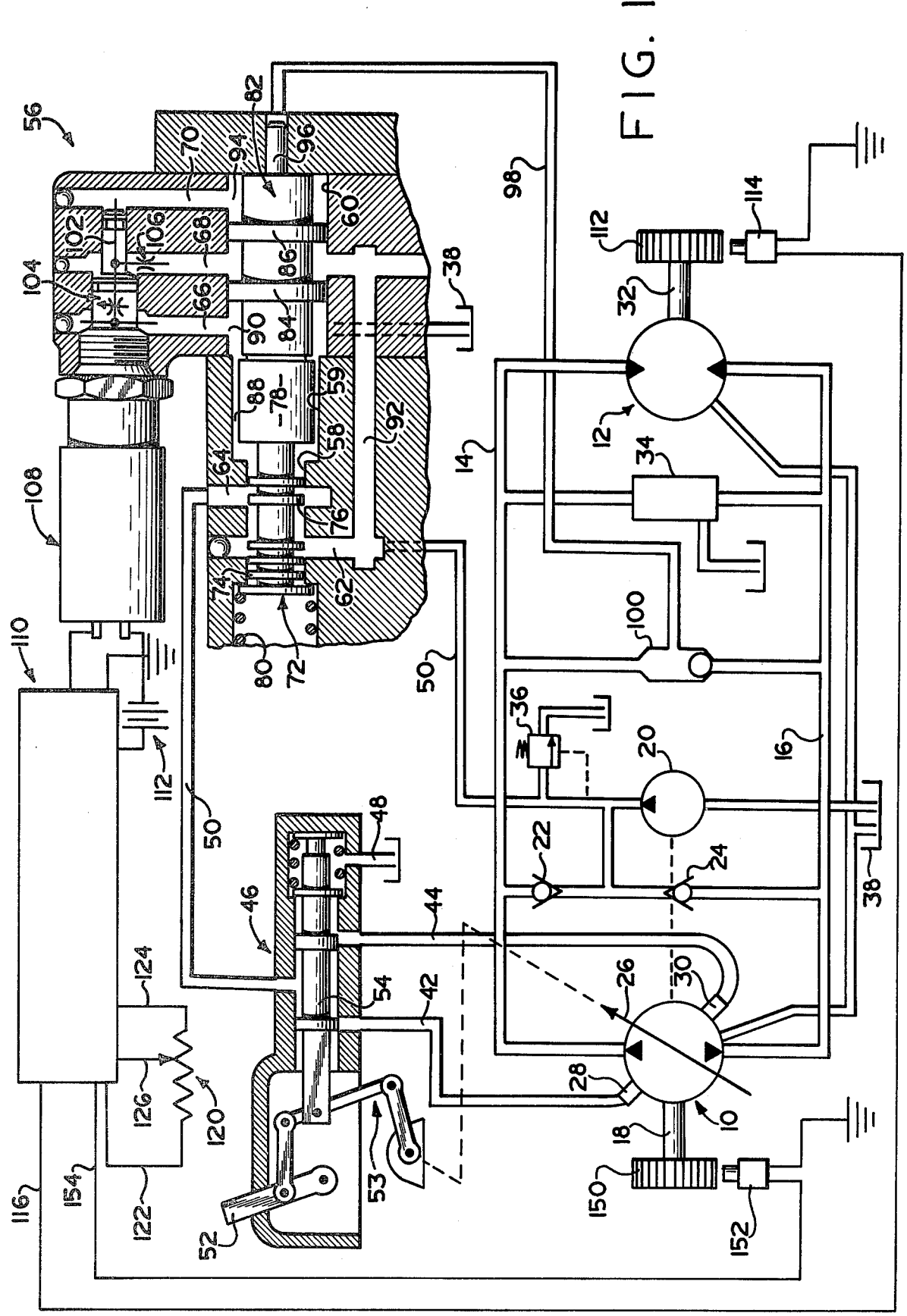
FIG. 1 is a partly schematic, partly cross section illustration of a hydrostatic transmission control system incorporating an electro-hydraulic control made in accordance with the present invention.

The hydrostatic transmission of FIG. 1 includes a variable displacement swashplate axial piston pump 10 hydraulically coupled to a fixed displacement motor 12 via conduits 14 and 16. Pump 10 is a well known type and includes an input shaft 18 which is used to drive the rotating group of the pump and also drive a charge pump 20 hydraulically coupled via check valves 22 and 24, respectively, to conduits 14 and 16. Pump 10 further includes a swashplate 26 which is movable over-center by a pair of known stroking cylinders 28 and 30. Motor 12 includes an output shaft 32. Hydraulically coupled in parallel with motor 12 is a known control mechanism 34 which includes a shuttle valve, a high pressure relief valve and a charge pressure relief valve. A charge pump relief valve 36 is hydraulically coupled to the output of charge pump 20. Pump 10, motor 12, and charge pump 20 are all in hydraulic communication with a reservoir 38.

Strokers 28 and 30 are hydraulically coupled via conduits 42 and 44 to a manual servo control valve 46. Conduit 48 communicates the spring chamber of control valve 46 with the reservoir. Another conduit 50 communicates the bore of control valve 46 with the charge pump as is well known in the art. Control valve 46 includes a control lever 52 and linkage 53 connecting a control valve spool 54 with swashplate 26, to center the spool 54 when the psoition of the swashplate matches the desired position, as set by the control lever 52.

All of the preceding elements are well known in the art of hydrostatic transmission controls. Accordingly, a further description of the operation of these elements does not appear to be warranted. The remaining portion of the specification will therefore be directed toward a description of an electro-hydraulic control, generally designated 56, and its operation with the previously described portions of the hydrostatic transmission. The control 56 is preferably made in accordance with co-pending application Ser. No. 801,884, filed May 31, 1977, entitled HYDRAULIC CONTROLLER, filed in the name of Kenneth K. Knapp, and assigned to the assignee of the present invention.

Electro-hydraulic control 56 includes a housing defining a multi-stepped bore 58, 59, and 60. A pair of axially spaced passages 62 and 64 intersect bore 58 and a plurality of axially spaced passages 66, 68, and 70 intersect and/or communicate with bore 60. Passage 62 receives pressurized fluid from the charge pump 20 through the upstream portion of conduit 50, while passage 64 communicates with the control valve 46 through the downstream portion of the conduit 50.

Disposed within bores 58 and 59 is a valve spool 72 including a plurality of lands 74, a pair of lands 76 and a single land 78. The lands 74 prevent fluid from flowing from bore 58 into the chamber which houses an adjustable spring 80, which biases spool valve 72 toward the position shown in FIG. 1, permitting fluid to flow from passage 62 to passage 64. Disposed within the bore 60 is a spool 82 including a pair of lands 84 and 86. In all operating positions of the spool 82, the land 84 separates passage 66 from passage 68 and land 86 separates passage 68 from passage 70.

The bore 59 and land 78 cooperate to define a passage 88 through which fluid may flow from passage 64 (when valve spool 72 is biased to the left of the position shown in FIG. 1). Fluid from passage 88 enters a chamber 90 which is in fluid communication with drain 38. Passage 68 is in communication with passage 62 through an axial passage 92 and therefore, contains fluid at charge pump pressure. The land 86 and bore 60 cooperate to define a fluid chamber 94, the fluid pressure in which is effective to bias spool 82 and valve spool 72 to the left in FIG. 1.

Electro-hydraulic control 56 further includes a roller needle 96 having one end in contact with the right end of spool 82 and the other end hydraulically coupled by means of a conduit 98 and a shuttle valve 100 to whichever of the conduits 14 or 16 contains high pressure fluid (system pressure). Accordingly, the leftward force exerted by roller needle 96 on spool 82 will be directly proportional to system pressure which, in most cases, will be the pressure of fluid flowing from the pump 10 to the motor 12.

The remaining portion of electro-hydraulic control 56 which will now be described is shown somewhat schematically. The passages 66 and 70 are interconnected by a fluid passage 102 which includes a variable orifice 104, while the passage 68 communicates with the fluid passage 102 through a fixed orifice 106. Because passage 68 contains fluid at charge pressure, and passage 66 is at drain pressure, it may be seen that the fluid pressure in passage 70 and chamber 94 will be inversely related to the area of variable orifice 104. The area of variable orifice 104 is controlled by a variable force valve 108 which is illustrated as a standard proportional pressure controller of the type sold commercially by Fema Corporation of Portage, Michigan. The fluid passage 102, variable orifice 104 and fixed orifice 106 are component parts of the Fema valve. The variable force valve 108 is connected by a pair of leads to an electrical control, generally designated 110 which is in series with a source of power 112. The function of the variable force valve 108 is to receive a pressure command signal from the electrical control 110 and change the variable orifice 104 in response to changes in the command signal, such that the fluid pressure in chamber 94 varies in a known manner with changes in the command signal. Preferably, the relationship between the command signal and the fluid pressure in chamber 94 should be linear, i.e., either directly proportional or inversely proportional.

As illustrated, the electro-hydraulic control 56 being used as an input horsepower limiter to limit the maximum horsepower required by the prime mover to drive the input shaft 18. The description of the electro-hydraulic control 56 as an input horsepower limiter is by way of example only and it should be apparent to those skilled in the art that it may be used in a number of other ways to control the operation of a hydrostatic transmission by providing different electrical controls having different input command signals to the force valve 108.

The electro-hydraulic control 56 operates on the well known hydraulic principle that the product of system pressure (P) and system flow (Q) is directly proportional to the input horsepower (HP) to the pump. In the hydrostatic transmission of FIG. 1, with the fluid motor 12 being of the fixed displacement type, motor output speed ($N_m$) is directly proportional to system flow (Q), such that:

$$HP \propto P \times N_m$$

Therefore, by varying maximum system pressure P in response to changes in motor output speed $N_m$ to maintain a constant product of P and $N_m$ (FIG. 2), it is possible to provide a simple but accurate input horsepower limiting means.

In the preferred embodiment, the above-described control may be accomplished by providing, as electrical inputs to the electrical control 110, the motor output speed $N_m$ and the maximum desired input horsepower. In FIG. 1, the motor output speed $N_m$ is provided by means of a toothed member 112, mounted for rotation with the shaft 32, and a magnetic pick-up 114. As is well known in the art, the pick-up 114 is a simple, inexpensive device that establishes lines of magnetic flux which are cut by the rotating toothed member 112. The result is the generation of an AC signal having a frequency proportional to the speed of rotation of the member 112, and thus, the motor output speed $N_m$. This AC signal is transmitted by the lead 116 as an input to the electrical control 110.

The other input to the control 110 is the maximum input horsepower HP. This may be set manually by means of a linear potentiometer 120, having its opposite ends connected to the control 110 by a lead 122 connected to a reference voltage $V_R$ and a lead 124 connected to a voltage $V^+$, which is above $V_R$ by a predetermined amount. The desired maximum input horsepower is selected by means of an adjustable wiper 126. The circuitry within the control 110 which is associated with the wiper 126 will be described in greater detail subsequently.

As the system pressure acting on the needle roller 96 increases and overcomes the force of the adjustable spring 80, the pressure of the fluid ported from the charge pump 20 to the manual control valve 46 is reduced. This occurs when spools 82 and 72 are moved leftward from the position shown in FIG. 1 to a position in which the lands 76 meter fluid flow between passages 62 and 64 and between passages 64 and 88. As the pressure of fluid ported to manual control valve 46 is reduced, the centering moments of pump 10 and the springs within stroking cylinders 28 and 30 act to decrease the displacement of the pump. As the displacement of the pump is decreased, the system flow Q also decreases, which in turn decreases motor output speed $N_m$, to maintain the product of P and $N_m$ constant, and not exceed the maximum input horsepower setting. If the system pressure P decreases, the result is the opposite of that described above.

In a typical system, the charge pump relief valve 36 may be set to limit charge pump pressure to about 200 psi, and the variable force valve 108 may be selected such that fluid pressure within chamber 94 varies linearly with the pressure command signal (from electrical control 110) from about 10 psi to about 150 psi. The high pressure relief valve in control mechanism 34 is generally set somewhere in the range of 3500 psi to 6000 psi. It is believed that those skilled in the art, having read the foregoing description in conjunction with FIG. 1 can make appropriate modifications in the relative areas of land 86 and roller needle 96 to achieve a desired horsepower limiting curve of the type shown in FIG. 2.

By way of introduction to the electrical control 110 and its circuitry, reference is now made to the block diagram of FIG. 3 illustrating the basic logic utilized in control 110. As was stated in the background of the specification, one feature of the electro-hydraulic control 56 is its use of a command signal which is the quotient obtained by "dividing" one system characteristic by another. The block diagram of FIG. 3 illustrates a logic circuit known to those skilled in the art of data manipulation which may be used to approximate a division, without the expense and difficulty of electrically performing a division. The instantaneous pressure command signal is connected by means of a feedback loop to a multiplier X, the other input to which is the motor output speed $N_m$. The resulting product of P and $N_m$ is a horsepower approximation signal HP'. A manually adjustable input horsepower setting HP is compared to the horsepower approximation signal HP' and the difference (or error) is fed to a high gain K (typically an inverting amplifier) which modifies the pressure command signal P in a manner tending to minimize the difference between HP and HP', i.e., adjust the maximum system pressure to maintain the actual input horsepower (represented by HP') as close as possible to the desired horsepower setting HP. The equations in support of this logic are as follows:

$$P = HP'/N_m = K(HP - HP')$$

$$P = K(HP - N_m P)$$

$$P + KN_m P = K \cdot HP$$

$$P(1 + KN_m) = K \cdot HP$$

$$P = K \cdot HP/1 + KN_m \text{ or}$$

$$P \cong HP/N_m$$

This is a good approximation if K is much larger than 1, but not quite as good for very small values of $N_m$ at which point the accuracy is not as important. Although the block diagram illustrated herein merely provides an approximation, it should be understood that the scope of the invention is not limited to a circuit which performs such an approximation. The high gain element K is used in the block diagram primarily to facilitate an understanding of the closed loop and to correspond to the equations presented above.

Referring now to FIG. 4, there is shown a circuit diagram of a preferred form of the circuitry which may be used to implement the logic shown in FIG. 3. The output speed of the motor shaft 32 is sensed by the speed pickup 114, as described previously, and transmitted to the control 110. The output signal generated by the pickup 114 is a sine wave (see GRAPH 1) the frequency of which is proportional to the motor output speed. The output of the pickup 114 is transmitted over a lead 116 to the input terminals of a comparator 118. When the sine wave is positive, the comparator 118 goes to positive saturation, and when the sine wave becomes negative, the comparator goes to negative saturation, thus converting the sine wave to a square wave (GRAPH 2), the frequency of which is still proportional to the motor speed $N_m$. Connected in parallel between lead 116 and a lead 121 are a pair of diodes 123 and 125, the characteristics of which are selected to limit the amplitude of the signal (both positive and negative) transmitted to the comparator 118.

The square wave output from the comparator 118 is transmitted by a lead 127 to the input of a monostable multivibrator 128 (frequently referred to as a "single shot"). The multivibrator 128 produces an output signal which goes to positive saturation (HI) each time a trigger pulse is received, and remains at positive saturation for a predetermined time period before returning to ground (LO), its only stable condition. Accordingly, the output from the multivibrator 128 is a square wave, the important feature of which is the "duty cycle" (i.e., the percentage of time at positive saturation), with the duty cycle being proportional to the motor speed $N_m$. Relatively lower speed results in a signal having a relatively lower duty cycle, as represented by GRAPH 3, while a relatively higher speed will have a signal such as that in GRAPH 4.

The output from the multivibrator 128 is conducted by a lead 130 to an analog switch 132 which includes switching means represented schematically by a movable switching element 134. The analog switch 132 is connected through a resistance 136 to a summing junction 138, which is also connected to the wiper 126 of the linear potentiometer 120 used to manually set the maximum desired input horsepower HP. It will be noted that the horsepower setting HP is always positive relative to a reference voltage $V_R$. The summing junction 138 is connected to the inverting terminal of an integrator circuit 140, which has its noninverting terminal connected to the reference voltage $V_R$. The output of the integrator circuit 140 is the pressure command signal P which is then transmitted to the variable force valve 108 to control the variable orifice 104.

A lead 142 is connected between the output of the integrator circuit 140 and the "HI" terminal of the analog switch 132, with the integrator circuit 140 including a feedback capacitor 144 connected between the lead 142 and the summing junction 138. The "LO" terminal of the analog switch 132 is connected to the reference voltage $V_R$.

For purposes of the subsequent description of the operation of the analog switch 132 and the integrator circuit 140, it will be assumed that the signal being conducted by the lead 130 is that illustrated by GRAPH 3. The analog switch 132 may be viewed as having two alternating "states" or conditions: when the input conducted over lead 130 is at ground (or negative saturation), the switching element 134 is connected through the LO terminal to the reference voltage $V_R$, and when the input signal is at positive saturation, the switching element 134 is connected through the HI terminal to the feedback lead 142 (as shown in FIG. 4).

When the switch 132 is at LO, the integrator circuit 140 integrates the positive horsepower setting signal HP, resulting in a decreasing pressure command signal P, as may be seen from the alternate decreasing portions of the curve on GRAPH 5 labelled "3", corresponding to the output speed represented by GRAPH 3. This decreasing pressure command signal results in a decreasing potential difference across the capacitor 144. The pressure command signal P and potential difference across capacitor 144 continue to decrease until the switch 132 goes to HI. The capacitor 144 then discharges through the parallel circuit containing the lead 142, the switching element 134 and the resistance 136. This discharge causes a decreasing voltage at the summing junction 138 which, after being inverted, results in an increasing pressure command signal P as may be seen from the alternate increasing portions of the curve 3 on GRAPH 5. The pressure command signal P continues to rise until the switch 132 again goes to LO, at which point the cycle just described begins again. It should be noted in viewing curve 3 of GRAPH 5 that the slopes of the signal P are somewhat exaggerated for clarity of illustration, and preferably, the capacitor 144 should be large enough to minimize the output "ripple" (amplitude) and approximate a DC signal.

At the same time, the capacitor 144 must be small enough to be properly responsive to changes in the input frequency. It is believed to be within the ability of one skilled in the art to select an appropriate capacitor 144 in view of the foregoing. In addition, it is believed that those skilled in the art would be able to match the capacitor 144 and resistance 136 to provide an R-C time constant such that, as the output speed $N_m$ increases (and the duty cycle increases), the pressure command signal curve will shift upwardly, (i.e., to have a smaller negative magnitude relative to $V_R$), indicating an appropriately smaller commanded pressure which, when multiplied by the higher output speed, will still equal the desired maximum input horsepower HP.

This upward shifting of the torque command signal curve is shown by the curve on GRAPH 5 labelled "4", corresponding to the output speed represented by GRAPH 4. In comparing curves 3 and 4, it should be noted that the slope of the decreasing portions is the same for both, but because the time spent at LO for the output speed of GRAPH 3 is about twice that for the output speed of GRAPH 4, the amplitude of the decreasing portion is also about twice. For either output speed, the time at HI is the same, but the R-C time constant curve for capacitor 144 and resistance 136 is such that, even though the slope changes, the amplitude of the increasing portions for curves 3 and 4 matches the amplitude of the respective decreasing portions.

Figure 5:
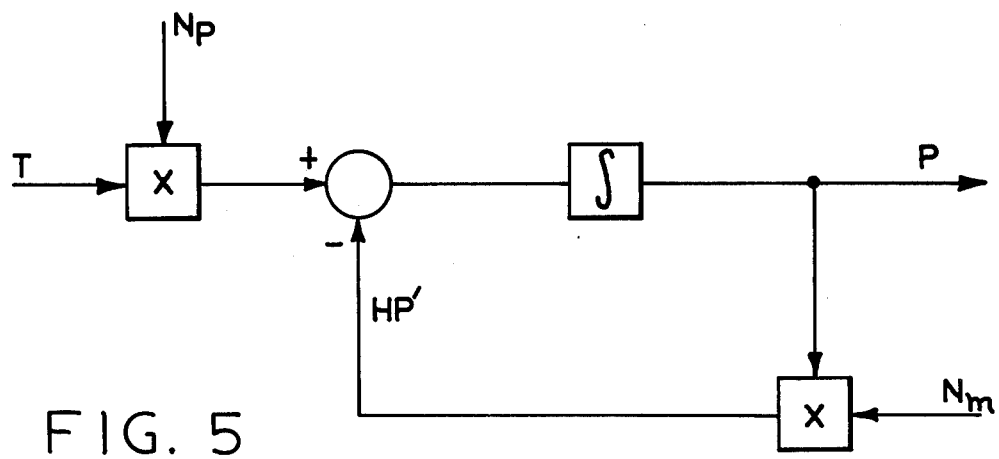
FIGS. 5 and 6 are block diagrams of circuit logic for two alternative embodiments of the present invention which comprise input torque limiter controls.
Figure 6:
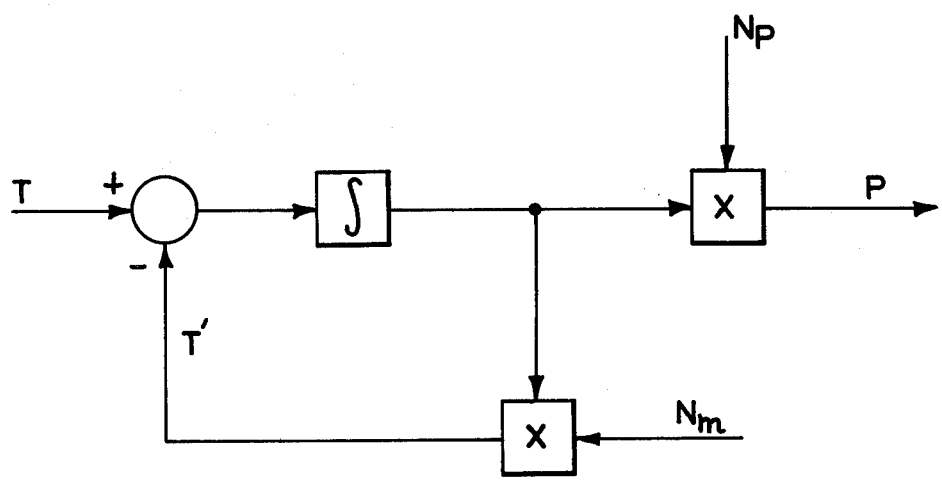

Referring now to the alternative embodiments illustrated by FIGS. 5 and 6, it may be seen that in both alternatives, the function of the logic is still the generation of an appropriate pressure command signal P. However, rather than a maximum input horsepower being selected by the operator, the manual setting is the maximum input torque T, based upon the well known relationship:

$$HP \propto T \times N_p$$

wherein $N_p$ is the pump input speed. Pump speed $N_p$ may be provided to the electrical control 110 in the same manner as motor output speed $N_m$. Referring to FIG. 1, a toothed member 150 is mounted for rotation with the pump input shaft 18. A magnetic pick-up 152 is mounted adjacent the member 150 and, in the manner described in connection with the pick-up 114, generates an AC signal having a frequency representative of the speed of rotation of the shaft 18. This AC signal is transmitted by a lead 154 to the control 110.

Referring now to FIG. 5, it may be seen that the main difference between the logic of FIG. 5 and the logic of FIG. 3 is the multiplication of the maximum input torque T and the pump input speed $N_p$ to obtain maximum input horsepower HP, rather than setting HP manually. It is believed that the reasons for selecting T rather than HP in certain circumstances would be obvious to those skilled in the art.

Referring now to the FIG. 6 embodiment, it may be seen that the same inputs (T, $N_m$ and $N_p$) are required, but the input torque T is fed directly to the summing juction (for comparison to T'), rather than first being multiplied by the pump speed $N_p$ to yield maximum input horsepower HP. The output of the integrator circuit ($\int$) is multiplied by the pump speed $N_p$, and, because the motor displacement is a constant, the result is the pressure command signal P.

It should be understood that although the invention is claimed hereinafter in terms of an input horsepower and a horsepower approximation signal, various modifications, such as the embodiments of FIGS. 5 and 6, are within the scope of the invention and the appended claims.

What is claimed is:

1. A control system for a hydrostatic transmission including a fluid pump and a fluid motor, said fluid pump having fluid operable means for varying the displacement thereof, and a source of pressurized fluid for operating the fluid operable means, said control system comprising:
   (a) a housing defining a valve bore, an inlet fluid port adapted for series fluid communication with the source of pressurized fluid, a control fluid port adapted for series fluid communication with the fluid operable means, and a drain fluid port adapted for communication with a fluid drian, said ports being in fluid communication with said valve bore;
   (b) valve means disposed in said valve bore and movable between a first position permitting fluid communication between said inlet fluid port and said control fluid port and a second position;
   (c) first means for biasing said valve means toward said first position;
   (d) second means for biasing said valve means toward said second position;
   (e) one of said first and second biasing means including:
      (1) means for generating a variable electrical command signal P; and
      (2) means responsive to said variable electrical command signal P to provide a variable biasing force, biasing said valve means toward said respective position, said variable biasing force being related to said variable electrical command signal P in a known manner;
   (f) said means for generating said command signal P including:
      (1) input command signal generator means which is variable to correspond to a maximum desired input to the transmission;
      (2) means providing an electrical signal $N_m$ representative of the output speed of the fluid motor, said maximum desired input being proportional to the product of P and $N_m$;
      (3) means providing an electrical input approximation signal representative of the product of the speed $N_m$ of the fluid motor and the instantaneous command signal P; and
      (4) means for comparing said input command signal and said input approximation signal and generating a new command signal P tending to minimize the difference between said input command signal and said input approximation signal.

2. A control system for a hydrostatic transmission including a fluid pump and a fluid motor, said fluid pump having fluid operable means for varying the displacement thereof, and a source of pressurized fluid for operating the fluid operable means, said control system comprising:
   (a) a fluid housing defining a valve bore, an inlet fluid port adapted for series fluid communication with the source of pressurized fluid, a control fluid port adapted for series fluid communication with the fluid operable means, and a drain fluid port adapted for communication with a fluid drain, said ports being in fluid communication with said valve bore;
   (b) valve means disposed in said valve bore and movable between a first position permitting fluid communication between said inlet fluid port and said control fluid port, and a second position restricting fluid communication between said control fluid port and said inlet fluid port;
   (c) first means for biasing said valve means toward said first position;
   (d) second means for biasing said valve means toward said second position;
   (e) one of said first and second biasing means including:
      (1) means for generating a variable electrical pressure command signal P; and
      (2) means responsive to said variable electrical pressure command signal P to provide a variable biasing force, biasing said valve means toward said respective position, said variable force being related to said variable electrical pressure command signal P in a known manner;
   (f) said means for generating said pressure command signal P including:
      (1) horsepower command signal generator means which is variable to correspond to a maximum desired input horsepower to the transmission;
      (2) means providing an electrical signal $N_m$ representative of the ouput speed of the fluid motor;
      (3) means providing an electrical horsepower approximation signal representative of the product of the speed $N_m$ of the fluid motor and the instantaneous pressure command signal P; and
      (4) means for comparing said horsepower command signal and said horsepower approximation signal and generating a new pressure command signal P tending to minimize the difference between said horsepower command signal and said horsepower approximation signal.

3. A control system as claimed in claim 1 or 2 wherein said means providing a variable biasing force comprises a fluid chamber and means responsive to the pressure of fluid in said fluid chamber to bias said valve means.

4. A control system as claimed in claim 3 including a source of pressurized fluid in communication with said fluid chamber and restriction means adapted for series fluid communication between said fluid chamber and a fluid drain.

5. A control system as claimed in claim 4 wherein said restriction means includes means defining a variable orifice and said means providing a variable biasing force includes means responsive to changes in said pressure command signal P to vary said variable orifice.

6. A control system as claimed in claim 5 wherein said variable orifice varies between a maximum orifice area and a minimum orifice area as said pressure command signal P varies between a maximum and a minimum.

7. A control system as claimed in claim 2 wherein said variable biasing force varies between a maximum and a minimum as said pressure command signal P varies between a maximum and a minimum.

8. A control system as claimed in claim 7 wherein said means generating said pressure command signal P includes logic utilizing the relationship $P = K(HP - HP')$, wherein K is a constant gain factor.

9. A control system as claimed in claim 1 or 2 wherein said comparing and generating means includes integrator circuit means to maintain said setting approximation signal HP′ substantially equal to said input setting HP.

10. A control system as claimed in claim 1 or 2 including a main flow control valve disposed in series fluid communication between said control fluid port and said fluid operable means.

11. A control system as claimed in claim 10 wherein said means for generating, and said means responsive to, said variable electrical command signal P comprise said second biasing means, and said second biasing means further includes means responsive to system pressure to bias said valve means toward said second position.

12. A control system as claimed in claim 11 wherein said means providing a variable biasing force comprises a fluid chamber and means responsive to the pressure of fluid in said fluid chamber to bias said valve means.

13. A control system as claimed in claim 12 including a source of pressurized fluid in communication with said fluid chamber and restriction means adapted for series fluid communication between said fluid chamber and a fluid drain.

14. A control system as claimed in claim 13 wherein said restriction means includes means defining a variable orifice and said means providing a variable biasing force includes means responsive to changes in said variable electrical command signal P to vary said variable orifice.

* * * * *